Feb. 2, 1971  D. ILLINGWORTH ET AL  3,559,448
DEVICE FOR ATTACHING METAL FITTINGS TO ELECTRICAL
CONDUCTORS OR THE LIKE
Filed Aug. 12, 1968  5 Sheets-Sheet 3
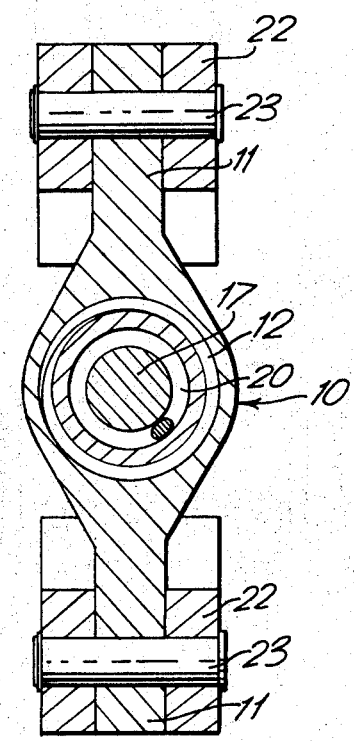
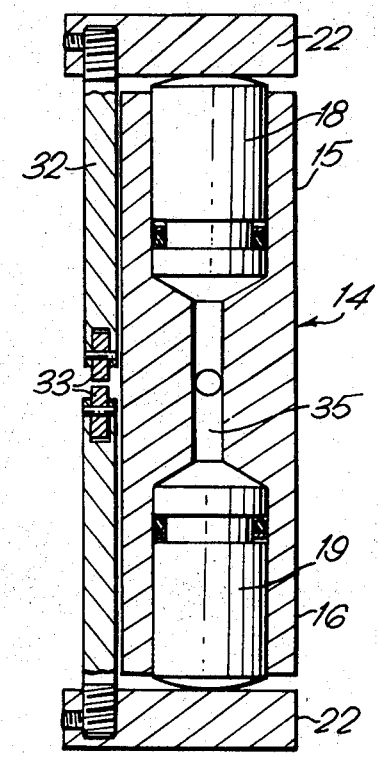
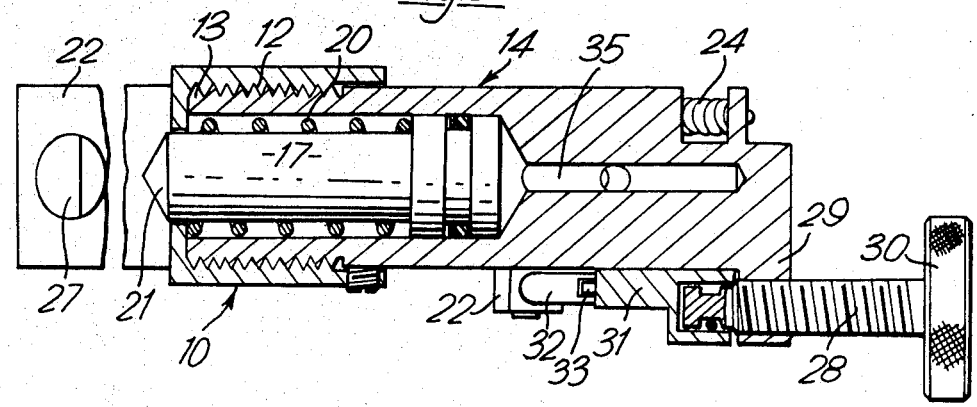

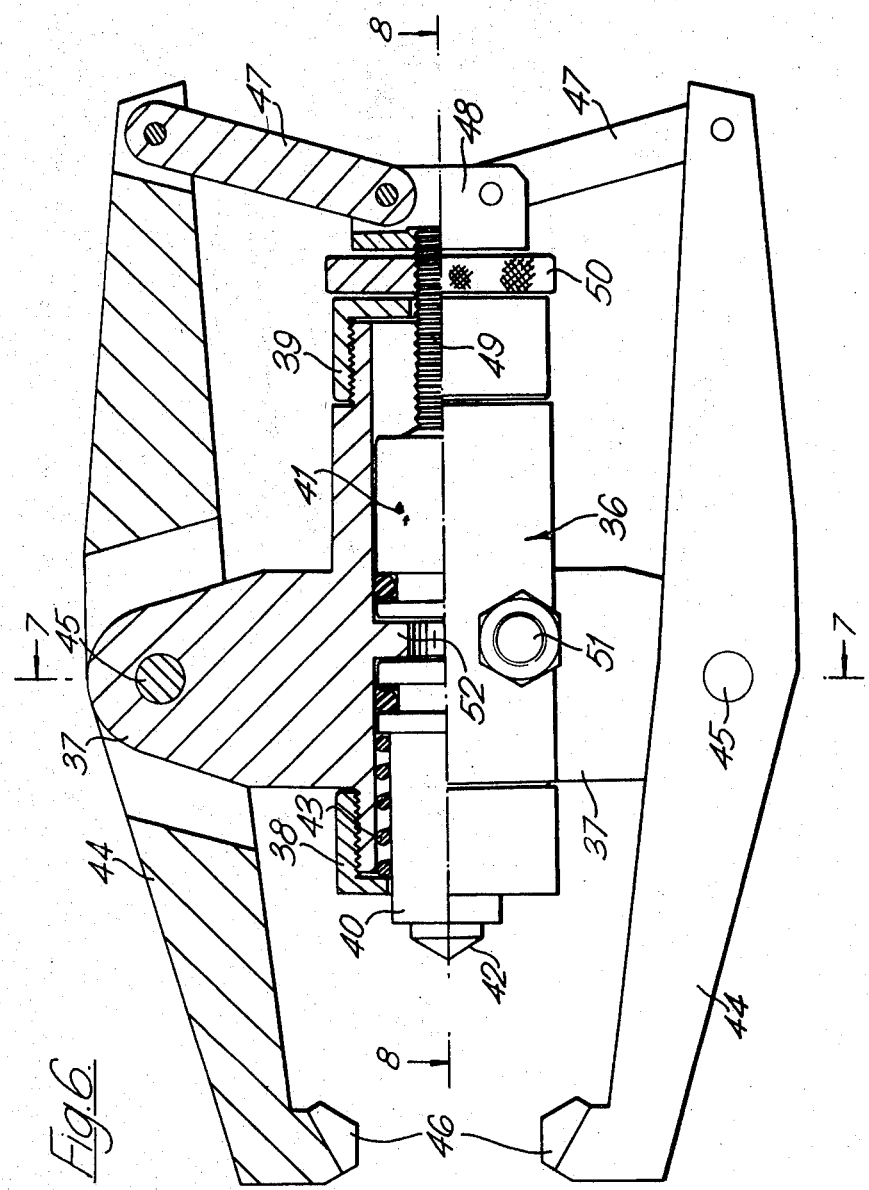

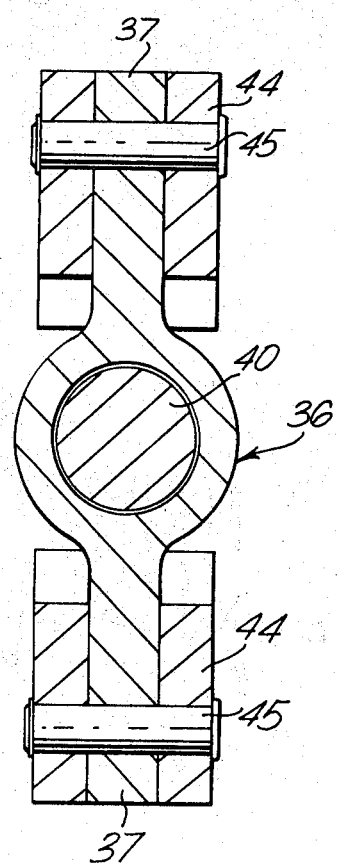
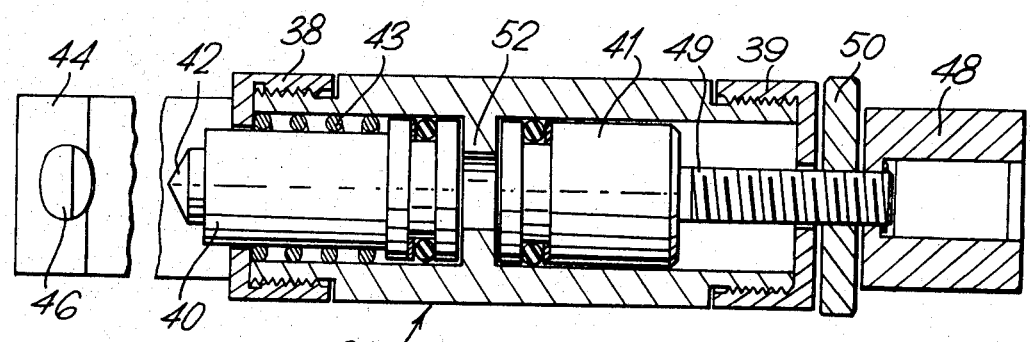

United States Patent Office 3,559,448
Patented Feb. 2, 1971

3,559,448
DEVICE FOR ATTACHING METAL FITTINGS TO ELECTRICAL CONDUCTORS OR THE LIKE
Duncan Illingworth and John Iceton, Leeds, England, assignors to Cable Covers Limited, Surbiton Surray, England, a corporation of the United Kingdom
Filed Aug. 12, 1968, Ser. No. 752,008
Claims priority, application Great Britain, Feb. 14, 1968, 7,249/68
Int. Cl. B21d 9/08
U.S. Cl. 72—410                                           5 Claims

ABSTRACT OF THE DISCLOSURE

A device for fixing a malleable metal fitting to an electrical conductor or other cable comprises three indenting elements, one on an hydraulic piston and two respectively on pivoted arms which extend in the same general direction as that of the piston. Other hydraulic means operate the arms so that operation of the piston and the other hydraulic means causes the three indenting elements to close upon and indent the fitting with positive pressure at three spaced points and cause portions of the fitting to engage or to penetrate interstices of the cable.

---

Figure 1:
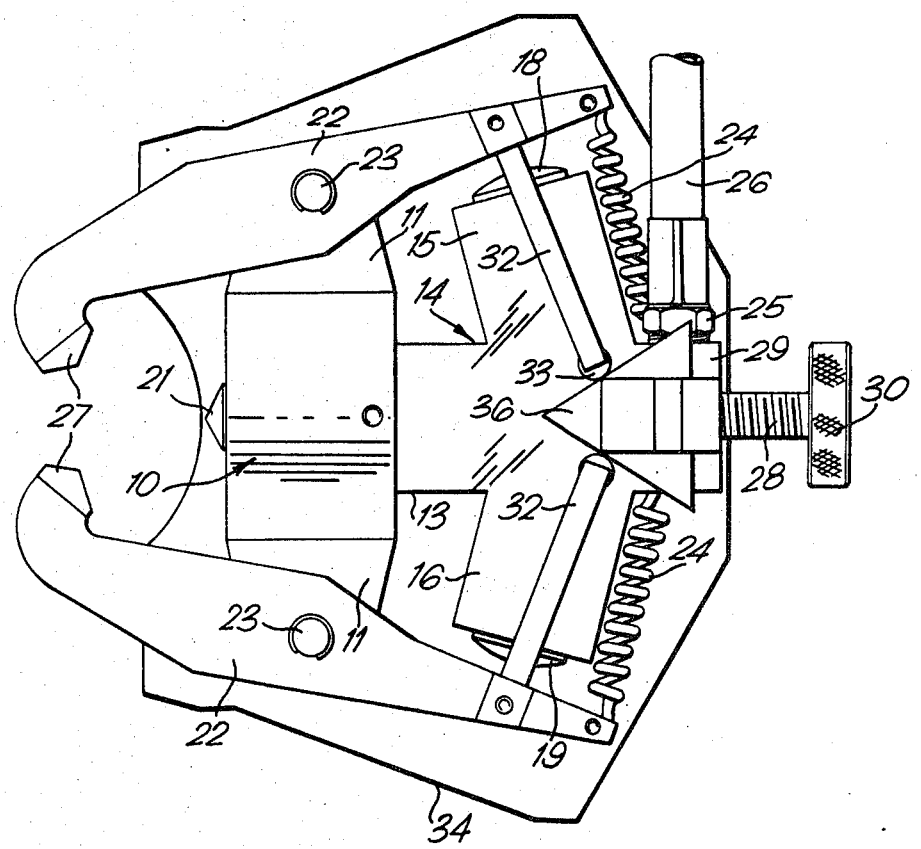

This invention relates to a device for attaching malleable metal conductors or other fittings to electrical conductors or the like, which conductors may be either stranded or solid cables of copper, aluminium or the like and may be of any shape and construction.

Known devices for the purpose of attaching, by crimping or indenting, electrical connectors and other fittings to electrical conductors or the like such that the connector or other fitting is subjected to either of the following methods:

(1) Deformation of the malleable fitting or connector is effected by a single die or indentor acting in a horizontal plane so that, when suitably engaged, it deforms the fitting or connector into a shape which is generally of U form in cross-section.

(2) Deformation of the malleable fitting or connector takes place by the action of four nibs or indent points acting together to deform the fitting or connector into a shape which is generally cruciform in cross-section.

Such devices are satisfactory for the purpose for which they are made but they have limitations in respect of their application of use. Thus, due to the fact that the crimping action is effected in four different directions, the mechanism necessary to effect this action tends to be rather cumbersome with the result that the device cannot be used in confined spaces where access to the work is restricted, for example when dealing with underground type multicore conductors. A similar disadvantage also applies to single die or indentor devices.

It is among the objects of the present invention to provide a device for attaching metal connectors or other fittings to electrical conductors or the like which has a wider field of use than known devices and has particular advantages in application to underground type multicore electrical conductor cables but of course is not limited in this respect.

According to the present invention, a device for attaching malleable metal connectors or other fittings to electrical conductor cables or the like enables the use of a method comprising placing the connector or other fitting over or around the conductor cable or the like, and thereafter applying pressure to the connector or other fitting at spaced positions around the circumference thereof so as to deform it at said spaced positions and cause portions thereof to enter into engagement with, or to penetrate the interstices of, the conductor cable or the like.

According to the invention furthermore, a device for attaching malleable metal conductors or other fittings to electrical conductor cables or the like, comprises three spaced circumferentially disposed indenting or piercing nibs which are mounted for movement inwardly towards a given point, means for moving one of said nibs towards said point, and other means for moving the other two of said nibs towards said point, wherein in use, the three nibs are operative to engage and deform spaced portions of a metal connector or other fitting disposed or around a conductor cable or the like so that said portions are forced to enter into engagement with, or to penetrate the interstices of, said conductor cable or the like.

Preferably, the device comprises a body member having a pair of oppositely disposed projecting pivot arms, a hydraulically operated piston mounted for lengthwise movement directly or indirectly within the body member and formed with, or having attached thereto, an indenting or piercing nib, a lever arm pivotally mounted at a position intermediate of its ends on each of said pivot arms, each lever being formed with, or having attached thereto, at one end an indenting or piercing nib, and hydraulically actuated means operatively associated with the other ends of said levers.

The hydraulically actuated means operatively associated with said other ends of said levers may comprise two pistons in direct operative engagement with the levers, or alternatively, a single piston operatively connected to the levers by means of toggle links.

According to a further feature of the invention, means are provided for rapidly advancing the movement of two of said indenting or piercing nibs which means are capable of overriding, or anticipating, the normal operational means.

Figure 2:
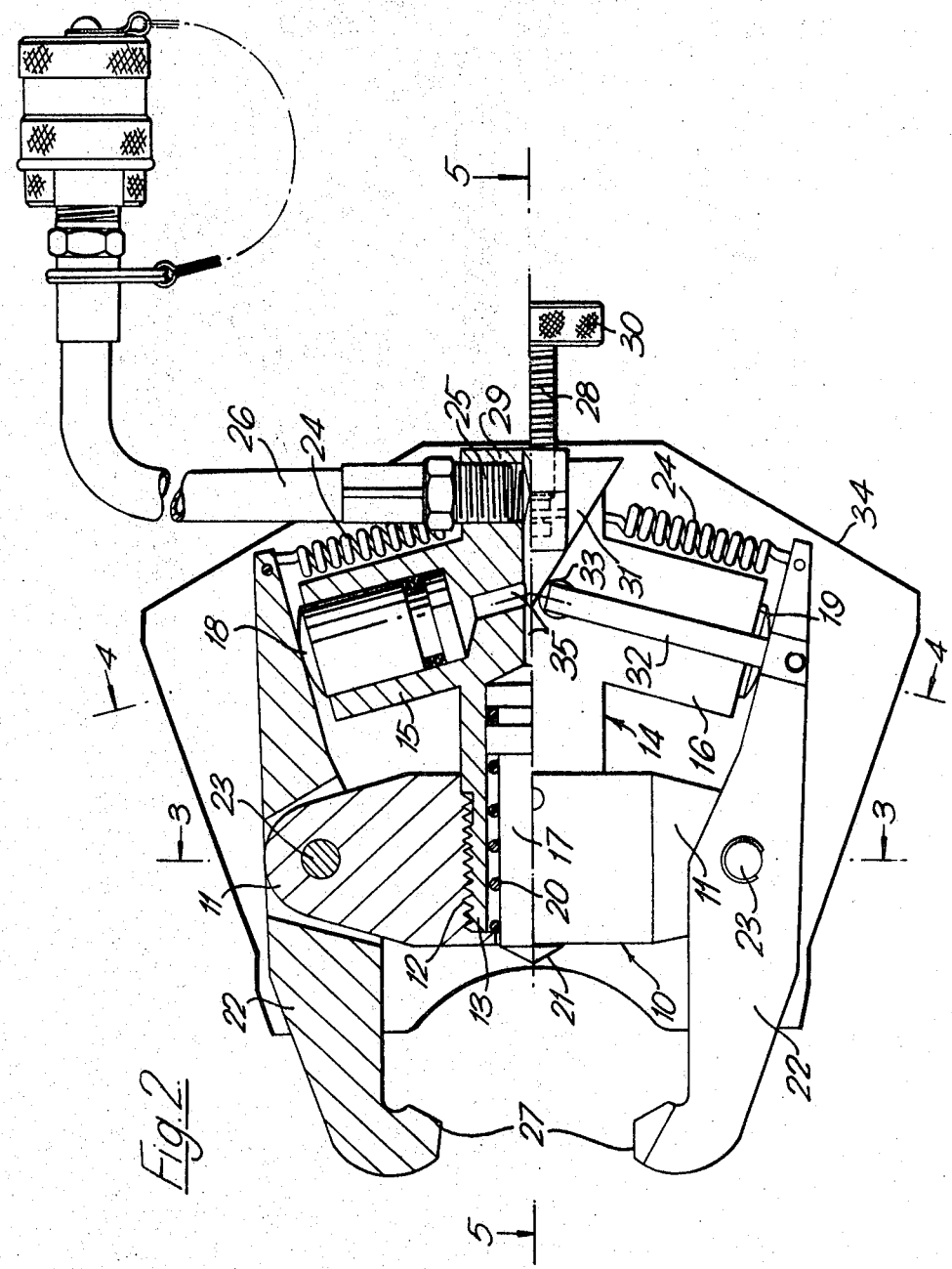

The invention is illustrated by way of example in the accompanying drawings in which:

FIG. 1 is a side elevation of one embodiment of a device according to the invention, FIG. 2 is a longitudinal section, partly in elevation, corresponding to FIG. 1, FIG. 3 is a section on the line 3—3 of FIG. 2, FIG. 4 is a section on the line 4—4 of FIG. 2, FIG. 5 is a section on the line 5—5 of FIG. 2, FIG. 6 is a longitudinal section, partly in elevation, of another embodiment of a device according to the invention, FIG. 7 is a section on the line 7—7 of FIG. 6, and
FIG. 8 is a section on the line 8—8 of FIG. 6.

Referring to FIGS. 1 to 5 of the drawings, the device comprises a cylindrical body member 10 formed at two diametrically opposite positions with projecting pivot arms 11. The member 10 is internally screw-threaded at 12 to receive a correspondingly screw-threaded leg 13 of a cross-shaped cylinder block 14, the leg 13 and arms 15 and 16 of the block 14 being formed with bores providing cylinders to receive respectively pistons 17, 18 and 19, the cylinders and their respectively associated pistons constituting piston and cylinder assemblies.

The piston 17, which has associated therewith a compression spring 20 to bias it into an inoperative position, is formed with, or has attached thereto, an indenting or piercing nib 21.

Levers 22 are pivotally mounted at 23 on the ends of the pivot arms 11, one end of each lever 22 being in operative engagement with its coacting piston 18 or 19 and being biased into an inoperative position by means of a tension spring 24.

A hydraulic fluid connection 25 is provided in the head of the block 14 for a hose 26 which supplies, via bores 35, fluid under pressure to the cylinder bores of the block 14.

The other ends of the levers 22 are formed with, or have attached thereto, indenting or piercing nibs 27.

Rapid advance means are provided to override, or anticipate, the action of the pistons 18 and 19, said means consisting of a threaded spindle 28 mounted for lengthwise movement in a projection 29 fixed to, or forming part of, the block 14. One end of the spindle 28 is formed with a knurled head 30 and the other end thereof is provided with a wedge-shaped actuating element 31. The element 31 is adapted to cooperate with projecting pins 32 fixed as by screw-threading respectively to the levers 22. The pins 32 are provided at their free ends with rollers 33.

The whole device is enclosed in a cover 34 of an insulating material.

The device is preferably for use with connectors or other fittings in which the clamping or fixing portion thereof is of U-shaped cross-section. It will be appreciated however that it is not limited in this respect and could therefore be used with other fittings, for example those having a clamping or fixing portion of tubular formation.

In use, using a connector or other fitting having a clamping, or fixing portion of U-shaped cross-section, the fitting is first positioned in the area of the nibs 21 and 27 and the screws 28, 30 is turned by hand so that the actuating element 31 causes the levers 22 to pivot about the pivot arms 11 and to close the nibs 27 onto the fitting so that the latter is firmly held in position by the nibs 21 and 27.

The fitting positioned in the apparatus is then placed over the cable or cables to which it is to be attached and hydraulic fluid under pressure is passed to the cylinder block 14 to cause the pistons 17, 18 and 19 to operate and apply pressure to the fitting, via the nibs 21 and 27, at three circumferentially spaced positions. Thus, initial movement of the levers 22 will cause the arms of the U-shaped portion to be wrapped around the cable or cables, further movement of all three nibs being effective to cause corresponding portions of the fitting to be forced into engagement with, or to pierce the interstices of, the cable. In this way a rigid connection is provided which connection, when used for electrical conductors, has good conducting properties.

The hydraulic circuit supplying pressure to the block 14 has included therein a pressure relief valve, which may be fixed or variable, and which is operative to release the pressure at a predetermined value so as to avoid over-compressing the fitting.

On completion of the compression operation, the piston 17 returns, under the action of the spring 20 to its inoperative position, and similarly, the levers 22 are returned, under the action of the springs 24, to their preset position dictated by the rapid motion screws 28, 30, 31 after which the device can be removed for further use.

The operation when using a connector or other fitting having a tubular clamping or fixing portion is the same as that described above except that the fitting will first be placed in position over the cable or cables to which it is to be attached, after which the device is placed over the fitting.

Referring to FIGS. 6 to 8 of the drawings, the alternative embodiment of the device comprises a cylindrical body member 36 having two diametrically oppositely disposed projecting pivot arms 37. The body 36 is provided with apertured end caps 38 and 39 and forms a cylinder within which is arranged a first piston 40 and a second piston 41.

The first piston 40 is formed with, or has attached thereto, an indenting or piercing nib 42 and is biased into an inoperative position by means of a compression spring 43.

Levers 44 are pivotally mounted at 45 on the pivot arms 37, one end of each lever being formed with, or having attached thereto, an indenting or piercing nib 46.

The other ends of the levers 44 are connected, via toggle levers 47, to a bracket 48 secured to the end of the second piston 41.

The rapid advance means in this embodiment is provided by forming the outer end 49 of the piston 41 of reduced cross-section and providing said end with a screw thread to receive a knurled nut 50 which is disposed between the end of the cylinder 36 and the bracket 48. In use, in order initially to grip a fitting, the nut 50 is turned to move the piston 41, and thus also the toggle levers 47, so that the levers 44 are caused to pivot about the pivot arms 37 to move the nibs 46 inwards.

A hydraulic fluid coupling 51 is provided in the cylinder 36 at a position between the inner ends of the pistons 40 and 41, which ends are kept apart by a spacing flange 52, so that when hydraulic pressure is applied the two pistons operate together in opposite directions.

The use and operation of this embodiment is the same as that hereinbefore described with reference to FIGS. 1 to 5.

Thus, it will be appreciated that the present invention provides a simple but effective device which is capable, by virtue of the fact that it can simply be passed with the fitting positioned therein over the cable, or over the fitting positioned on the cable, of being used in positions in which the working space is restricted.

It will further be appreciated that, by providing the device with three indenting or piercing nibs in accordance with the invention, maximum access is available and pressure can be applied to the fitting in a simple manner from one side or end of the device.

We claim:

1. A device for fixing a malleable metal fitting to an electrical conductor or other cable, comprising a body member; a pair of oppositely extending pivot arms formed to project from said body member; an hydraulic cylinder in said body member; an hydraulic piston operable in said cylinder; an indenting element provided on one end of said piston; two levers respectively pivotally mounted on said pivot arms and extending in the same general direction as that of said piston; an indenting element provided on one end of each of said levers adjacent the indenting element on said piston; and other hydraulically operated means operable upon the other ends of said levers for moving said levers angularly about their respective pivots, whereby said piston and said other hydraulically operated means are operative to apply positive pressure to, and to move, all three of said indenting elements inwardly toward a given point and whereby said three indenting elements respectively deform three spaced portions of said fitting and the three deformed portions are forced to enter into engagement with, or to penetrate interstices of, said cable.

2. A device as claimed in claim 1 in which said other hydraulically operated means comprises two piston and cylinder assemblies, the cylinder of each assembly being formed in said body member and the pistons of said assemblies being engageable respectively with said other ends of said levers, said device further including spring means interposed between said levers and said body member for biasing said levers toward inoperative nonindenting positions.

3. A device as claimed in claim 1 in which said other hydraulically operated means comprises another cylinder in said body member in axial alignment with the hydraulic cylinder specified in claim 1; another piston operable in said other cylinder; and links extending between and connecting said other piston respectively to said other ends of said levers.

4. A device for fixing a malleable metal fitting to an electrical conductor or other cable, comprising a pair of oppositely extending pivot arms formed on said body member; a power operated piston arranged in said body member; an indenting element provided on one end of said piston; a lever pivotally mounted on each of said pivot arms; an indenting element provided on one end of each of said levers; further power operated means for angularly moving said levers about said pivot arms; and rapid advance means to override, or anticipate, the action of said further power operated means, said rapid advance means comprising an axially adjustable hand-operated threaded spindle, said actuating element being arranged to engage projecting pins fixed to said levers, whereby axial movement of said threaded spindle is operative to cause angular movement of said levers about said pivot arms independently of said further power operated means.

5. A device for fixing a malleable metal fitting to an electrical conductor or other cable, comprising a pair of oppositely extending pivot arms formed on said body member; a power operated piston arranged in said body member; an indenting element provided on one end of said piston; a lever pivotally mounted on each of said pivot arms; an indenting element provided on one end of each of said levers; further power operated means for angularly moving said levers about said pivot arms; and rapid advance means to override, or anticipate, the action of said further power operated means, said rapid advance means comprising a threaded spindle forming part of said power operated piston, and a knurled nut mounted on said threaded spindle whereby, in use, turning of said nut is effective to cause axial movement of said spindle and thus angular movement of said levers relative to said pivot arms independently of said further power operated means.

References Cited
UNITED STATES PATENTS

| | | | |
|---|---|---|---|
| 2,647,814 | 8/1953 | Chilton | 72—399 |
| 443,029 | 12/1890 | Wood | 72—402 |
| 2,828,353 | 12/1953 | Adams et al. | 72—410 |

FOREIGN PATENTS

| | | | |
|---|---|---|---|
| 397,807 | 2/1966 | Switzerland | 29—628 |

CHARLES W. LANHAM, Primary Examiner

M. J. KEENAN, Assistant Examiner

U.S. Cl. X.R.
29—280; 72—394